(12) United States Patent
Cloft

(10) Patent No.: US 9,091,214 B2
(45) Date of Patent: Jul. 28, 2015

(54) REDUCED GEARBOX SIZE BY SEPARATE ELECTRICALLY POWERED ENGINE OIL SYSTEM

(75) Inventor: Thomas G. Cloft, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 2525 days.

(21) Appl. No.: 11/823,496

(22) Filed: Jun. 28, 2007

(65) Prior Publication Data

US 2009/0003992 A1    Jan. 1, 2009

(51) Int. Cl.
| | |
|---|---|
| *F02C 7/32* | (2006.01) |
| *F02K 3/06* | (2006.01) |
| *F01D 25/18* | (2006.01) |
| *F01D 25/20* | (2006.01) |
| *F01D 15/10* | (2006.01) |

(52) U.S. Cl.
CPC ... *F02C 7/32* (2013.01); *F02K 3/06* (2013.01); *F01D 15/10* (2013.01); *F01D 25/18* (2013.01); *F01D 25/20* (2013.01); *F05D 2240/14* (2013.01)

(58) Field of Classification Search
CPC ......... F01D 25/18; F01D 25/20; F01D 15/10; F02C 7/32
USPC ..................... 60/39.08, 802, 226.1
See application file for complete search history.

(56) References Cited

U.S. PATENT DOCUMENTS

| | | | |
|---|---|---|---|
| 3,806,067 A | 4/1974 | Kutney | |
| 4,147,029 A | 4/1979 | Sargisson | |
| 5,080,303 A | 1/1992 | Hutton | |
| 5,253,470 A * | 10/1993 | Newton | 60/39.08 |
| 6,116,015 A | 9/2000 | Taylor et al. | |
| 6,170,252 B1 | 1/2001 | Van Duyn | |
| 6,212,974 B1 | 4/2001 | Van Duyn | |
| 6,260,351 B1 | 7/2001 | Delano et al. | |
| 6,357,220 B1 | 3/2002 | Snyder et al. | |
| 6,360,989 B1 | 3/2002 | Maguire | |
| 6,735,952 B2 * | 5/2004 | Olsen | 60/778 |
| 6,945,031 B2 | 9/2005 | Lair | |
| 7,055,330 B2 | 6/2006 | Miller | |
| 7,090,165 B2 | 8/2006 | Jones et al. | |
| 7,421,835 B2 * | 9/2008 | Rabovitser et al. | 60/39.12 |
| 7,681,402 B2 * | 3/2010 | Champion et al. | 60/779 |
| 2005/0150204 A1 | 7/2005 | Stretton et al. | |
| 2006/0248900 A1 | 11/2006 | Suciu et al. | |

FOREIGN PATENT DOCUMENTS

| | | |
|---|---|---|
| EP | 843359 | 8/1960 |
| EP | 2187796 A | 9/1987 |
| EP | 1067282 A2 | 1/2001 |
| WO | 0079103 A1 | 12/2000 |

OTHER PUBLICATIONS

Extended European Search Report of the European Patent Office, dated Dec. 8, 2011, in counterpart Application No. 08252176.6.

* cited by examiner

*Primary Examiner* — Craig Kim
(74) *Attorney, Agent, or Firm* — Kinney & Lange, P.A.

(57) ABSTRACT

An accessory system for use in a gas turbine engine, which system includes a gearbox adapted to be arranged radially outward of a main axis of the gas turbine engine and inside a nacelle, one or more engine accessories respectively connected to and driven by the gearbox, and a gas turbine engine oil system driven by a source other than the gearbox.

20 Claims, 4 Drawing Sheets

US 9,091,214 B2

REDUCED GEARBOX SIZE BY SEPARATE ELECTRICALLY POWERED ENGINE OIL SYSTEM

BACKGROUND

The present invention relates to accessory gearboxes used in gas turbine engines. More particularly, the present invention relates to a reduced size accessory gearbox.

Gas turbine engines, such as turbofans, commonly include accessory systems, which may be distinguished from the principal engine components, for example, the fan, compressors, combustor, and turbines. One such accessory system is the accessory gearbox. The accessory gearbox is commonly driven by a power take-off shaft, sometimes referred to as a tower shaft, connected to and driven by a main engine shaft, for example, the compressor shaft. The accessory gearbox, in turn, commonly drives several engine accessories connected to the gearbox at gearbox pads. One such engine accessory driven by and connected to the accessory gearbox is an electrical generator used to power various electrical systems in the engine, as well as the onboard electrical systems of the plane to which the engine is attached. Another accessory commonly connected to the accessory gearbox is the main engine oil system, which is used to lubricate components of the engine, for example, bearing components of the compressors and the turbines. In some engine configurations, the accessory gearbox, and the accessories connected thereto, may be mounted radially outward from the main axis of the engine, aft of the fan and low pressure compressor section, and inside a nacelle around which working medium gas is driven by the fan section to produce thrust.

The size and arrangement of prior accessory gearboxes create several challenges in gas turbine engine design. In particular, the size and arrangement of prior gearboxes and the accessories connected thereto has degraded engine efficiency by necessitating a radially outward bulge in the nacelle surrounding the gearbox. The nacelle shape is important to engine efficiency, as the nacelle defines the aerodynamic surface across which working medium gas is driven from the fan section to produce thrust. The bulge in the nacelle shape surrounding the gearbox degrades efficiency by acting to remove energy from the working medium gas as it travels over the bulged surface. In modern high bypass turbofan engines, the nacelle shape is particularly important to engine efficiency, because a large percentage, for example 75%, of the thrust used to propel the engine is produced by the fan section.

SUMMARY

Embodiments of the present invention include an accessory system for use in a gas turbine engine, which system includes a gearbox adapted to be arranged radially outward of a main axis of the gas turbine engine and inside a nacelle, one or more engine accessories respectively connected to and driven by the gearbox, and a gas turbine engine oil system driven by a source other than the gearbox.

Embodiments of the present invention may also include an accessory system for use in a gas turbine engine, which system includes one or more engine accessories, a gearbox driven by a shaft of the gas turbine engine and adapted to mechanically drive the one or more engine accessories, and an electrically powered gas turbine engine oil system. The gearbox and the engine accessories are configured to be arranged radially outward of a main axis of the gas turbine engine and inside a nacelle. The gas turbine engine oil system is offset from the gearbox such that the gas turbine engine oil system is not located radially outward of the gearbox and inside the nacelle.

DETAILED DESCRIPTION

Figure 1:
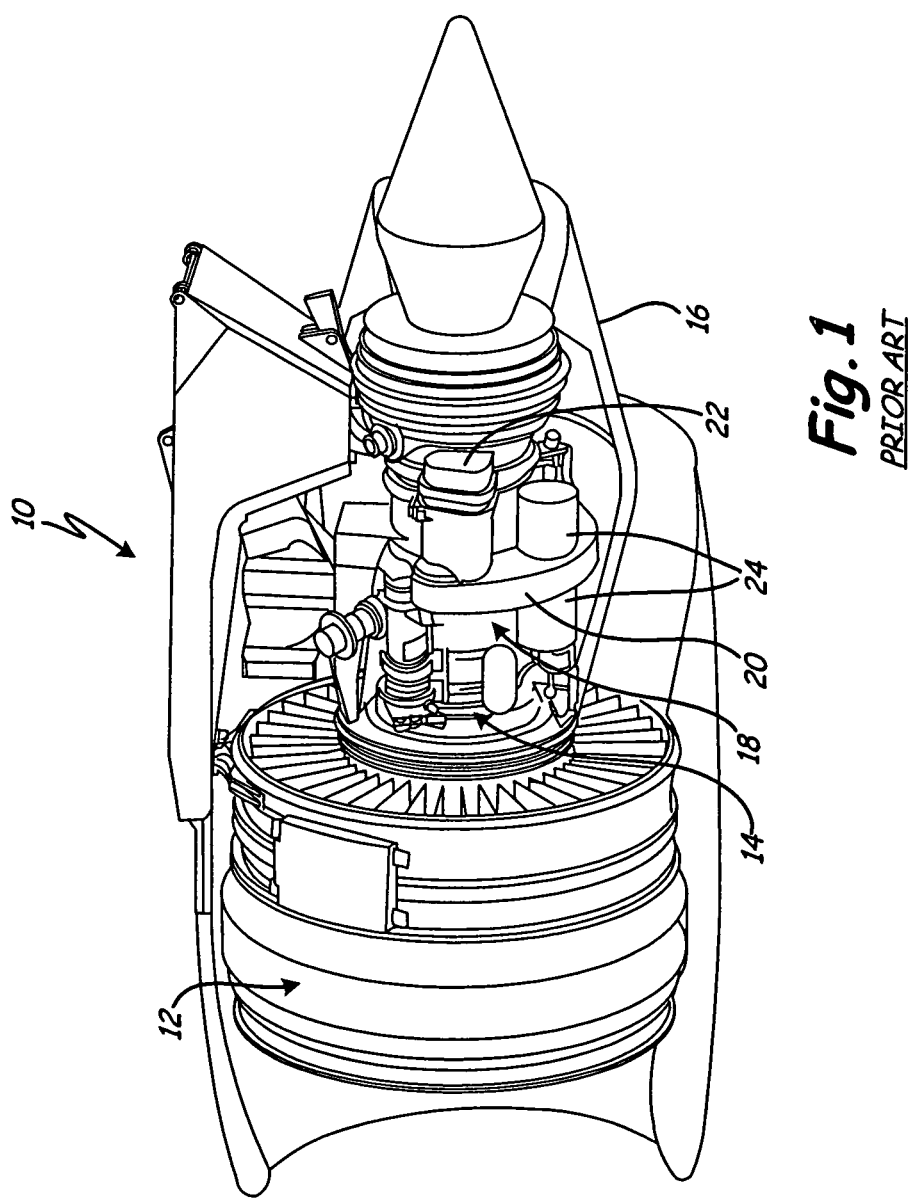
FIG. 1 is a perspective view of a gas turbine engine including prior art accessory gearbox and engine oil system.

FIG. 1 is a perspective view of gas turbine engine 10 including fan section 12, engine core 14, nacelle 16, and accessory gearbox assembly 18. Accessory gearbox assembly 18 includes accessory gearbox 20, first engine accessory 22, and second engine accessory 24. In FIG. 1, fan section 12 is located in the front of engine 10 and is configured to rotate about a main axis of engine 10. Fan section 12 draws working medium gas, for example air, into the front of engine 10. Fan section 12 may also include one or more low pressure compressor stages nested radially inward of one or more fan rotors in fan section 12. The gas drawn into engine 10 by fan section 12 is commonly separated into two flow streams. One gas flow stream exits fan section 12 and proceeds aftward into engine core 14. Engine core 14 commonly includes high pressure compressor stages, a combustor, and a turbine section, which may include low and high pressure turbine stages. The gas is compressed in the compressor section, mixed with fuel and ignited in the combustor and expanded in the turbine section. A portion of the energy extracted from the gas by expansion in the turbine section is used to drive fan section 12 and the compressor section in engine core 14. The remaining energy of the gas is used to produce thrust by driving the gas from the turbine section in engine core 14 out the rear of engine 10. The gas stream not diverted into engine core 14 exits fan section 12, proceeds aftward over the outside of nacelle 16, and exits engine 10 to produce thrust.

Engine 10 shown in FIG. 1 includes accessory gearbox assembly 18, which includes accessory gearbox 20 and first and second engine accessories 22, 24. Accessory gearbox 20 and first and second engine accessories 22, 24 are connected to engine 10 and located radially outward of engine core 14 and inside nacelle 16. Gearbox 20 may be driven by a power take-off shaft connected to one of the main shafts of engine 10, for example, a compressor shaft. First and second engine accessories 22, 24 are in turn driven by gearbox 20. First engine accessory 22 may be, for example, an electrical generator positioned on an aft side of the accessory gearbox 20 as shown in FIG. 1. Second engine accessory 24 may be, for example, a main engine oil system positioned on an aft and forward side of accessory gearbox 20 as shown in FIG. 1.

Figure 2:
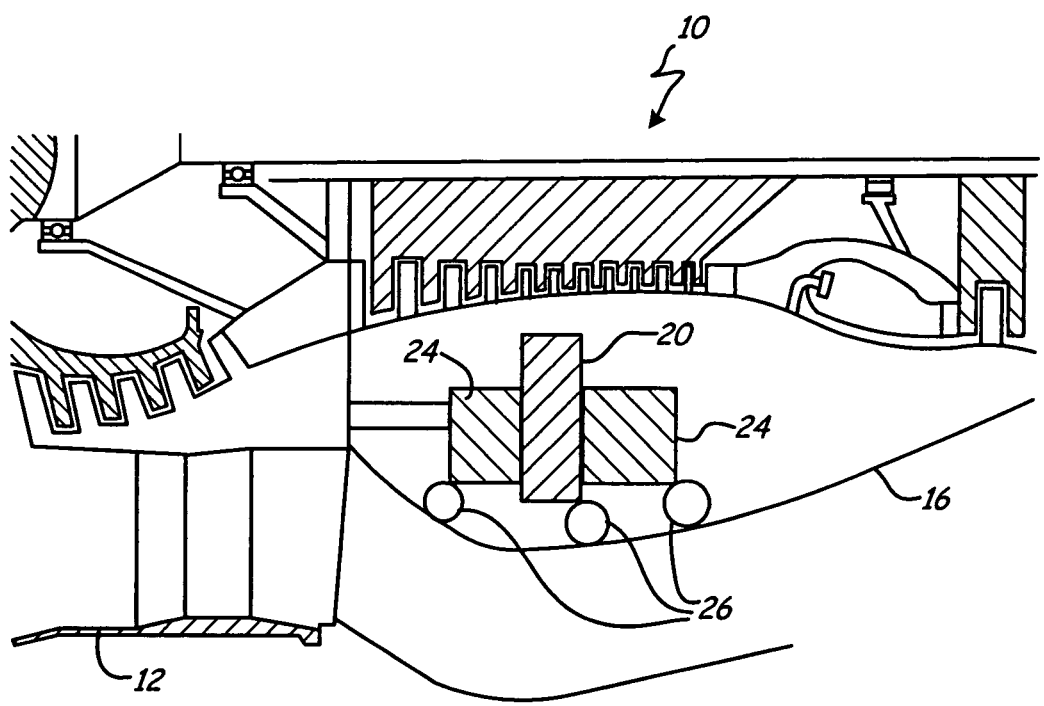
FIG. 2 is a schematic section view of the gas turbine engine of FIG. 1.
Figure 3:
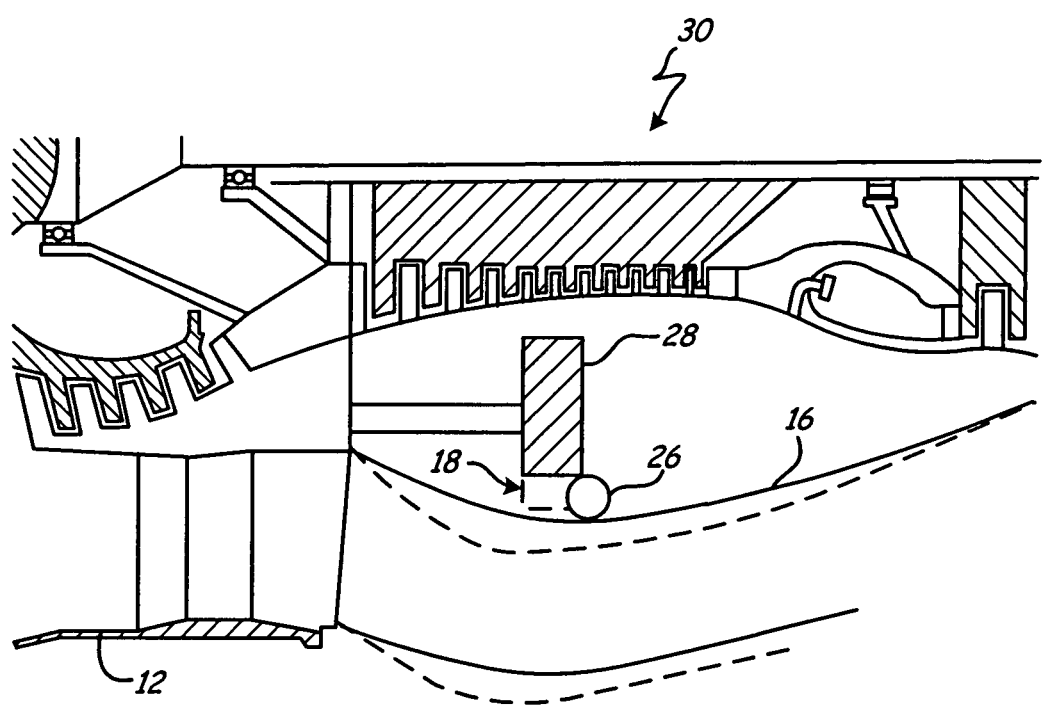
FIG. 3 is a schematic section view of an embodiment of a gas turbine engine according to the present invention including a reduced size accessory gearbox.

FIG. 2 is a schematic section view of engine 10 shown in FIG. 1 including fan section 12, nacelle 16, accessory gearbox 20, engine oil system 24 and clearance gaps 26 (shown schematically as circles). In FIG. 3, the size and arrangement of gearbox 20 and engine oil system 24 in engine 10 reduces the external shape of nacelle 16 adjacent gearbox 20. Specifically, gaps 26 define distances between maximum radial dimensions of gearbox 20 and engine oil system 24, and adjacent points on nacelle 16. Gaps 26 represent clearance distances between gearbox 20 and engine oil system 24, and nacelle 16, which act as a limiting design constraint on the aerodynamic shape of nacelle 16. In engine 10 shown in FIGS. 1 and 2, the size of gearbox 20 and the arrangement of engine oil system 24 necessitates a radially outward bulge in nacelle 16 at gap distances 26. The bulge in the shape of nacelle 16 surrounding gearbox 20 and engine oil system 24 degrades the efficiency of engine 10 by acting to remove energy from the working medium gas as it travels over the bulged surface.

Figure 4:
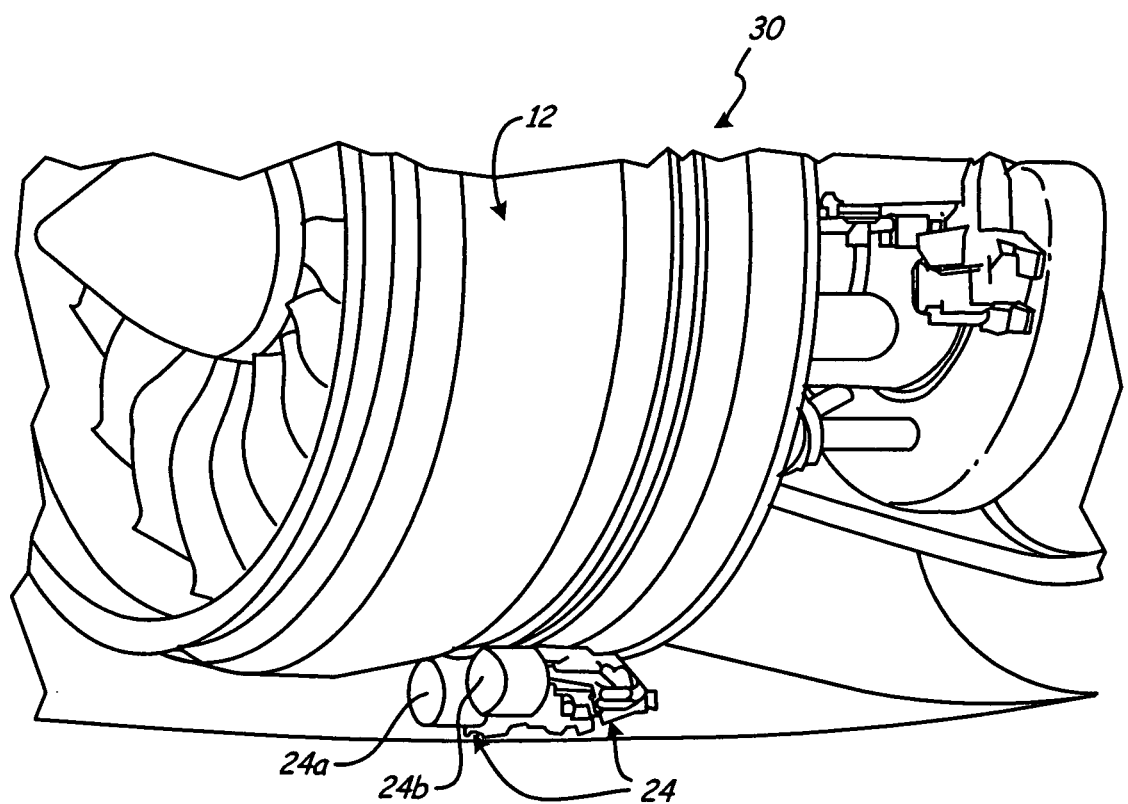
FIG. 4 is a perspective view of the gas turbine engine shown in FIG. 3 including the engine oil system mounted in the fan casing.

FIG. 3 is a schematic section view of an embodiment of gas turbine engine 30 according to the present invention including nacelle 16 and gearbox 28. In engine 30 of FIG. 3, gearbox 28 may be driven by a main shaft of engine 30, for example the compressor shaft, and in turn gearbox 28 may drive one or more engine accessories. Engine oil system 24 shown in FIGS. 1 and 2 is disconnected from gearbox 28, thereby substantially removing a portion of the bulge in nacelle 16. Furthermore, disconnecting engine oil system 24 from accessory gearbox 28 allows one or more radial dimensions of gearbox 28 to be reduced. In FIG. 3, the size of gearbox 28 is reduced from the size of gearbox 18 shown in dashed lines in FIG. 3. Disconnecting engine oil system 24 from gearbox 28 and reducing the radial dimension of gearbox 28 significantly reduces the limiting effect of clearance gaps 26 on the aerodynamic shape of nacelle 16. As shown in FIG. 4, the radially outward bulge in the shape of nacelle 16 surrounding gearbox 28 has been substantially reduced, while maintaining the required clearance gap 26 between gearbox 28 and nacelle 16.

Gas turbine engines and gas turbine accessory systems according to the present invention may include engine oil systems arranged in various locations disconnected from accessory gearbox 28. In general, embodiments according to the present invention include arrangements where engine oil system 24 is not located radially outward of accessory gearbox 28 and inside nacelle 16. For example, in FIG. 4, engine oil system 24 is located outside the casing surrounding fan 12. Engine oil system 24, now disconnected from gearbox 28, may be separately driven by, for example, electrical motors 24a, 24b, as shown in the embodiment of FIG. 4.

Accessory gearboxes according to the present invention and accessory systems and gas turbines including such gearboxes have several advantages over prior designs. The engine oil system is disconnected from the accessory gearbox, thereby substantially removing the limiting effect of the engine oil system arrangement on the aerodynamic shape of the nacelle. As a result of disconnecting the engine oil system from the accessory gearbox, the size of accessory gearboxes according to the present invention may be reduced. Disconnecting the engine oil system and reducing the size of the gearbox reduces one or more radial dimensions of the accessory gearbox assembly from the main axis of the engine. Reducing the radial dimensions of the accessory gearbox assembly in turn reduces the limiting effect of the gearbox assembly size on the aerodynamic shape of the nacelle. Specifically, disconnecting the engine oil system from the accessory gearbox and reducing the size of the gearbox improves the aerodynamic shape of the nacelle by significantly reducing the size of the radially outward bulge in the nacelle surrounding the gearbox. Improving the aerodynamic shape of the nacelle significantly improves overall engine efficiency, which in turn reduces operation costs by improving fuel economy.

Although the present invention has been described with reference to preferred embodiments, workers skilled in the art will recognize that changes may be made in form and detail without departing from the spirit and scope of the invention.

The invention claimed is:

1. An accessory system for use in a turbofan engine, the accessory system comprising:
   a gearbox adapted to be arranged radially outward of a main axis of the turbofan engine and inside a nacelle;
   one or more engine accessories arranged inside the nacelle and connected to and driven by the gearbox; and
   a turbofan engine oil system driven by one or more electric motors.

2. The system of claim 1, wherein the turbofan engine oil system is offset from the gearbox such that the turbofan engine oil system is not located inside the nacelle.

3. The system of claim 2, wherein the turbofan engine oil system is axially offset from the gearbox.

4. The system of claim 2, wherein the turbofan engine oil system is circumferentially offset from the gearbox.

5. The system of claim 2, wherein the turbofan engine oil system is axially and circumferentially offset from the gearbox.

6. The system of claim 1, wherein the turbofan engine oil system is attached to a radially outer surface of a fan casing surrounding a fan section forward of the gearbox.

7. The system of claim 1, wherein the gearbox and the turbofan engine oil system are arranged to provide clearance for reducing one or more radial dimensions of the nacelle from the main axis of the turbofan engine.

8. The system of claim 1, wherein the turbofan engine oil system is driven by a plurality of electric motors.

9. An accessory system for use in a turbofan engine, the system comprising:
   one or more engine accessories;
   a gearbox driven by a shaft of the turbofan engine and adapted to mechanically drive the one or more engine accessories; and
   an electrically powered turbofan engine oil system;
   wherein the gearbox and the one or more engine accessories are configured to be arranged radially outward of a main axis of the turbofan engine and inside a nacelle; and
   wherein the turbofan engine oil system is offset from the gearbox such that the turbofan engine oil system is not located inside the nacelle.

10. The system of claim 9, wherein the turbofan engine oil system is axially offset from the gearbox.

11. The system of claim 9, wherein the turbofan engine oil system is circumferentially offset from the gearbox.

12. The system of claim 9, wherein the turbofan engine oil system is axially and circumferentially offset from the gearbox.

13. The system of claim 9, wherein the turbofan engine oil system is attached to a radially outer surface of a fan casing surrounding a fan section forward of the gearbox.

14. The system of claim 9, wherein the gearbox and the turbofan engine oil system are arranged to provide clearance for reducing one or more radial dimensions of the nacelle from the main axis of the turbofan engine.

15. A turbofan engine comprising:
   a fan section, a compressor section, a combustor, and a turbine section;
   a nacelle proceeding aft from the fan section and substantially surrounding the compressor section, the combustor, and the turbine section;
   an accessory gearbox located aft of the fan section, radially outward of the compressor section, the combustor, and the turbine section, and inside the nacelle;

one or more engine accessories arranged inside the nacelle and connected to and driven by the accessory gearbox; and a turbofan engine oil system configured to be driven by one or more electric motors outside of the nacelle.

16. The engine of claim 15, wherein the turbofan engine oil system is axially offset from the accessory gearbox.

17. The engine of claim 15, wherein the turbofan engine oil system is circumferentially offset from the accessory gearbox.

18. The engine of claim 15, wherein the turbofan engine oil system is axially and circumferentially offset from the accessory gearbox.

19. The engine of claim 15, wherein the turbofan engine oil system is attached to a radially outer surface of a fan casing surrounding the fan section forward of the accessory gearbox.

20. The engine of claim 15, wherein the accessory gearbox and the turbofan engine oil system are arranged to provide clearance for reducing one or more radial dimensions of the nacelle from the main axis of the turbofan engine.

* * * * *